US010124675B2

(12) United States Patent
Lu et al.

(10) Patent No.: US 10,124,675 B2
(45) Date of Patent: Nov. 13, 2018

(54) METHOD AND DEVICE FOR ON-LINE PREDICTION OF REMAINING DRIVING MILEAGE OF ELECTRIC VEHICLE

(71) Applicant: Hefei University of Technology, Hefei (CN)

(72) Inventors: Xiaonong Lu, Hefei (CN); Qiang Zhang, Hefei (CN); Wanying Wang, Hefei (CN); Anning Wang, Hefei (CN); Shanlin Yang, Hefei (CN); Minglun Ren, Hefei (CN); Zhanglin Peng, Hefei (CN)

( * ) Notice: Subject to any disclaimer, the term of this patent is extended or adjusted under 35 U.S.C. 154(b) by 0 days.

(21) Appl. No.: 15/794,989

(22) Filed: Oct. 26, 2017

(65) Prior Publication Data
US 2018/0118033 A1    May 3, 2018

(30) Foreign Application Priority Data
Oct. 27, 2016   (CN) .......................... 2016 1 0956071

(51) Int. Cl.
*B60L 3/12*     (2006.01)
*B60L 11/18*    (2006.01)

(52) U.S. Cl.
CPC ............ *B60L 3/12* (2013.01); *B60L 11/1861* (2013.01); *B60L 2240/12* (2013.01); *B60L 2240/421* (2013.01); *B60L 2240/547* (2013.01); *B60L 2240/549* (2013.01); *B60L 2240/62* (2013.01); *B60L 2240/64* (2013.01); *B60L 2240/662* (2013.01); *B60L 2260/52* (2013.01); *B60L 2260/54* (2013.01)

(58) Field of Classification Search
CPC ...... Y02T 90/128; Y02T 90/14; Y02T 90/163
See application file for complete search history.

(56) References Cited

U.S. PATENT DOCUMENTS 6,480,767 B2 * 11/2002 Yamaguchi ............. B60K 6/46
                                                      180/165
9,104,537 B1 *  8/2015 Penilla .................... G06F 17/00
                            (Continued)

FOREIGN PATENT DOCUMENTS

CN        102303538 A      1/2012
CN        103213504 A      7/2013
                            (Continued)

*Primary Examiner* — Truc M Do
(74) *Attorney, Agent, or Firm* — Wayne & Ken, LLC; Tony Hom

(57) ABSTRACT

The present invention relates to a method and device for on-line prediction of remaining driving mileage of an electric vehicle. The method comprises: acquiring in-transit data and driving environment data of the electric vehicle which is driving; calculating the power consumption per mileage of the electric vehicle in the current case by using the in-transit data and the driving environment data in combination with a power consumption rate data model; predicting the remaining driving mileage of the electric vehicle based on the power consumption per mileage. The device provided by the present invention is implemented on the basis of the method above. The prediction result of the present invention is more accurate, to avoid the problem that the power is exhausted due to exceeding the mileage expected by a user so that the electric vehicle cannot continue to drive, thereby improving the driving experience of the user.

7 Claims, 6 Drawing Sheets

(56) References Cited

U.S. PATENT DOCUMENTS

| | | | | |
|---|---|---|---|---|
| 9,229,905 B1* | 1/2016 | Penilla | ................... | G06F 17/00 |
| 9,697,503 B1* | 7/2017 | Penilla | ................... | G06Q 10/20 |
| 9,733,098 B2* | 8/2017 | Inoue | ................ | G01C 21/3469 |
| 9,916,071 B2* | 3/2018 | Penilla | ................. | B60W 40/08 |
| 2008/0039989 A1* | 2/2008 | Pollack | .............. | B60L 11/1811 |
| | | | | 701/22 |
| 2008/0040223 A1* | 2/2008 | Bridges | .............. | B60L 11/1816 |
| | | | | 705/14.69 |
| 2008/0052145 A1* | 2/2008 | Kaplan | ................ | G06Q 10/0631 |
| | | | | 705/7.12 |
| 2009/0043519 A1* | 2/2009 | Bridges | ................. | G01D 4/004 |
| | | | | 702/62 |
| 2009/0066287 A1* | 3/2009 | Pollack | ................. | G06Q 50/00 |
| | | | | 320/101 |
| 2010/0171642 A1* | 7/2010 | Hassan | ................. | G01C 17/38 |
| | | | | 340/992 |
| 2011/0087390 A1* | 4/2011 | Pandit | .................... | B60K 1/00 |
| | | | | 701/22 |
| 2011/0185196 A1* | 7/2011 | Asano | ................. | B60L 11/1809 |
| | | | | 713/300 |
| 2011/0221400 A1* | 9/2011 | Takizawa | ............ | B60L 11/1816 |
| | | | | 320/166 |
| 2011/0224868 A1* | 9/2011 | Collings, III | ....... | B60L 11/1857 |
| | | | | 701/33.4 |
| 2012/0262081 A1* | 10/2012 | Zhang | ............... | H02M 3/33561 |
| | | | | 315/223 |
| 2012/0286723 A1* | 11/2012 | Ukita | .............. | G06Q 10/06312 |
| | | | | 320/107 |
| 2013/0096745 A1* | 4/2013 | Hussain | ................ | B60W 20/00 |
| | | | | 701/22 |
| 2013/0096746 A1* | 4/2013 | Hussain | ................ | B60W 10/02 |
| | | | | 701/22 |
| 2013/0226443 A1* | 8/2013 | Scofield | ............. | B60R 16/0232 |
| | | | | 701/123 |
| 2014/0278089 A1* | 9/2014 | Gusikhin | ............... | G01C 21/00 |
| | | | | 701/533 |
| 2014/0279707 A1* | 9/2014 | Joshua | ............... | G06Q 30/0283 |
| | | | | 705/400 |
| 2014/0306663 A1* | 10/2014 | Ngo | .................... | B60L 11/1803 |
| | | | | 320/128 |
| 2015/0260835 A1* | 9/2015 | Widmer | .................. | G01S 13/04 |
| | | | | 342/27 |
| 2015/0308848 A1* | 10/2015 | Inoue | .................. | B60L 11/1838 |
| | | | | 701/521 |
| 2015/0345977 A1* | 12/2015 | Saito | ......................... | B60L 3/00 |
| | | | | 701/521 |
| 2016/0023554 A1* | 1/2016 | Tseng | ........................ | B60L 3/12 |
| | | | | 701/22 |
| 2016/0114698 A1 | 4/2016 | Chow et al. | | |
| 2016/0187519 A1* | 6/2016 | Widmer | .................. | G01V 3/10 |
| | | | | 324/222 |
| 2016/0214489 A1* | 7/2016 | Giusti | ........................ | B60L 3/12 |
| 2016/0332664 A1* | 11/2016 | Oldridge | ............... | B62D 5/065 |

FOREIGN PATENT DOCUMENTS

| | | |
|---|---|---|
| CN | 103273921 A | 9/2013 |
| CN | 104986043 A | 10/2015 |

* cited by examiner

METHOD AND DEVICE FOR ON-LINE PREDICTION OF REMAINING DRIVING MILEAGE OF ELECTRIC VEHICLE

TECHNICAL FIELD

The present invention relates to the field of energy source management technology, and more particularly, to a method and device for on-line prediction of remaining driving mileage of an electric vehicle.

BACKGROUND

As the driving force of the electric vehicle is supplied by use of a battery, the endurance mileage of the electric vehicle is limited, resulting in that it is very easy that the electric vehicle broke down due to power exhaustion. To this end, it is needed to evaluate battery power and driving mileage of the electric vehicle. When the driving mileage of the electric vehicle is evaluated in the prior art, generally, SOC of a vehicle-mounted battery is firstly estimated (state of charge evaluation) so as to obtain the condition of the power stored by the vehicle, and then the remaining driving mileage is roughly estimated according to the average energy consumption level of the vehicle. In this method, it is not enough accurate to calculate the power consumption of the attachments, and the current remaining driving mileage is only estimated. As the consumption of the battery power at a lower level is faster, and the road condition of the city is complex, the power has been exhausted in the case that the remaining driving mileage is not reached so that the vehicle broke down on the road, which brings great inconvenience to the user.

SUMMARY

In view of the shortcomings in the prior art, the present invention provides a method and device for on-line prediction of remaining driving mileage of an electric vehicle, for solving the problem that the power is exhausted due to exceeding the mileage expected by a user resulting from calculating remaining driving mileage inaccurately in the prior art.

An embodiment of the present invention provides a method for on-line prediction of the remaining driving mileage of the electric vehicle, comprising:

acquiring in-transit data and driving environment data of the electric vehicle which is driving;

calculating the power consumption per mileage of the electric vehicle in the current case by using the in-transit data and the driving environment data in combination with a power consumption rate data model; and predicting the remaining driving mileage of the electric vehicle based on the power consumption per mileage.

Alternatively, the power consumption rate data model is obtained through the following steps:

acquiring the in-transit data of the electric vehicle to form a historical running data set, and the driving environment data of the electric vehicle to form a historical driving environment data set;

fusing the historical running data set and the historical driving environment data set to obtain in-transit time series data of the electric vehicle;

acquiring correlation between the power consumption per mileage of the electric vehicle and the respective parameter in the historical running data set and the historical driving environment data set by using a correlation analysis method in a preset driving environment; and after removing the parameters whose correlations are less than the preset value of correlation, fitting the power consumption per mileage and the remaining parameters to obtain the power consumption rate data model of the electric vehicle.

Alternatively, the step of acquiring the in-transit data of the electric vehicle to form the historical running data set, and the driving environment data of the electric vehicle to form the historical driving environment data set comprises:

reading the in-transit data of the electric vehicle through a CAN bus, including battery status information, motor status information and vehicle speed information, wherein the battery status information includes the value of voltage of a battery pack, the value of current of the battery pack and the value of remaining charge of the battery pack, the motor status information includes a motor speed, and the vehicle speed information includes a current driving speed and driving mileage;

reading the driving environment data of the electric vehicle, including weather information and road condition information, wherein the weather information includes the type of weather at the current geographical position and an ambient temperature, and the road condition information includes the type and tilt degree of road surfaces; and storing the in-transit data and the driving environment data in a file in which the historical running data set is located and a file in which the historical driving environment data set is located, respectively.

Alternately, the step of fusing the historical running data set and the historical driving environment data set to obtain the in-transit time series data of the electric vehicle comprises:

performing normalization processing on the in-transit data;

performing parameterization processing on the driving environment data; and fusing the in-transit data and the driving environment data into a data set according to the recording time to be saved in a file in which the in-transit time series data is located.

Alternately, the method of the normalization processing includes: one or more of a Min-Max normalization method, z-score normalization method, a decimal scaling normalization method, a linear function conversion method, a logarithmic function conversion method, an arccotangent function conversion method and a proportion method.

Alternately, the step of acquiring the correlation between the power consumption per mileage of the electric vehicle and the respective parameter in the historical running data set and the historical driving environment data set by using the correlation analysis method in the preset driving environment comprises:

selecting and determining a analysis time window according to the preset driving environment;

calculating the power consumption per mileage of the electric vehicle according the in-transit data included in each analysis time window and the formula of the preset power consumption per mileage; and calculating the correlation between the respective parameter in the historical running data set and the historical driving environment data set and the power consumption per mileage of the electric vehicle by using a factor analysis method.

Alternately, the formula of the preset power consumption per mileage is:

$$C_L = \frac{B_{t_1} - B_{t_n}}{L_{t_n} - L_{t_1}};$$

in this formula, $C_L$ is the power consumption per mileage of the electric vehicle; $B_{t_1}$ and $B_{t_n}$ represents the remaining power of the electric vehicle at the start time and end time of the time window, respectively; and $L_{t_n}$ and $L_{t_1}$ represents the driving mileage of the electric vehicle at the start time and end time of the time windows, respectively.

Alternately, the step of after removing the parameters whose correlations are less than the preset value of correlation, fitting the power consumption per mileage and the remaining parameters to obtain the power consumption rate data model of the electric vehicle comprises:

presetting the power consumption rate data model of the electric vehicle, that is, $C_L = a_1 f(x_1) + a_2 f(x_2) + \ldots + a_m f(x_m) + \ldots + a_N f(x_N)$, wherein $x_1, x_2, \ldots, x_m, \ldots, x_N$ represents that the parameters whose correlations are not less than the preset value of correlation; $f(x_1), f(x_2), \ldots, f(x_m), \ldots, f(x_N)$ represents the correlation function between each parameter and the model; $a_1, a_2, \ldots, a_m, \ldots, a_N$ represents the coefficient of the respective function; and m is a nonzero natural number less than N; and calculating the value of each coefficient $a_m$ and the linear or mapping relationship between the respective correlation function $f(x_m)$ and the respective parameter $x_m$ by the control variable method using the in-transit data in a preset number of analysis time windows, so as to obtain the power consumption rate data model.

In a second aspect, the embodiment of the present invention also provides a device for on-line prediction of remaining driving mileage of an electric vehicle, comprising:

an electric vehicle data acquisition module, for acquiring in-transit data and driving environment data of the electric vehicle that is driving;

a battery consumption rate acquisition module, for calculating the power consumption per mileage of the electric vehicle in the current case by using the in-transit data and the driving environment data in combination with a power consumption rate data model; and a remaining driving mileage prediction module, for predicting the remaining driving mileage of the electric vehicle based on the power consumption per mileage.

Alternatively, the device further includes a power consumption rate data model update module. The power consumption rate data model update module includes:

an electric vehicle historical data acquisition unit, for acquiring the in-transit data of the electric vehicle to form a historical running data set, and the driving environment data of the electric vehicle to form a historical driving environment data set;

an in-transit time series data acquisition unit, for fusing the historical running data set and the historical driving environment data set to obtain in-transit time series data of the electric vehicle;

a correlation acquisition unit, for acquiring correlation between the power consumption per mileage of the electric vehicle and the respective parameter in the historical running data set and the historical driving environment data set by using a correlation analysis method in a preset driving environment; and a power consumption rate and parameter fitting unit, for after removing the parameters whose correlations are less than the preset value of correlation, fitting the power consumption per mileage and the remaining parameters to obtain the power consumption rate data model of the electric vehicle.

In view of the technical solutions above, the present invention obtains in-transit data and driving environment data of the electric vehicle that is driving; then calculating the battery consumption rate of the electric vehicle in the current driving environment by using the data above and the power consumption rate data model; finally, predicting the remaining driving mileage of the electric vehicle based on the power consumption per mileage in the current case. The present invention using the in-transit data and the driving environment data of the electric vehicle in real time can guarantee the authenticity of the data, while the power consumption rate data model being maintained to be the update state can guarantee the accuracy of the prediction result. The prediction result of the present invention is more accurate, to avoid problems that the power is exhausted due to exceeding the mileage expected by the user so that the electric vehicle cannot continue to drive, thereby improving the driving experience of the user, as compared to the calculation method in the prior art using the average energy consumption level.

BRIEF DESCRIPTION OF THE DRAWINGS

In order to more clearly illustrate the technical solutions in the embodiments of the present invention or the prior art, the drawings which are needed to be used in the embodiments or the prior art are briefly described below, and it will be apparent that the following drawings are some embodiments of the present invention, and other drawings may be also obtained by those skilled in the art without making inventive work according to these drawings.

DESCRIPTION OF THE EMBODIMENTS

In order to make the purpose, the technical solutions and the advantages of the embodiments of the present invention more apparent, the technical solutions in the embodiments of the present invention will be described below in a clear and complete manner in conjunction with the drawings in the embodiments of the present invention. Obviously, the described embodiments are part embodiments of the present invention, but not all embodiments. All other embodiments obtained by those skilled in the art without making creative work based on embodiments in the present invention are within the protection scope of the present invention.

Figure 1:
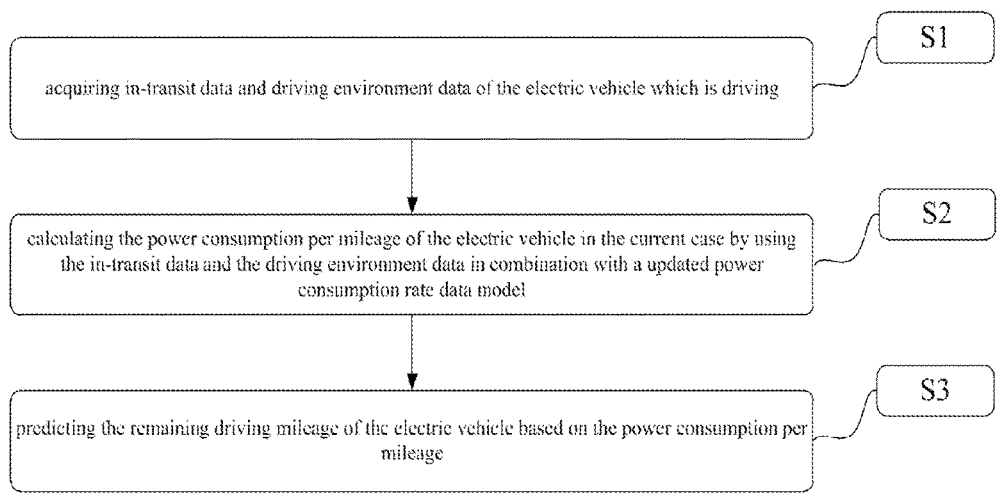
FIG. 1 is a schematic flowchart of a method for on-line prediction of the remaining driving mileage of an electric vehicle based on in-transit data provided by an embodiment of the present invention.

An embodiment of the present invention provides a method for on-line prediction of the remaining driving mileage of an electric vehicle, as shown in FIG. 1, comprising:

S1, acquiring in-transit data and driving environment data of the electric vehicle which is driving;

S2, calculating the power consumption per mileage of the electric vehicle in the current case by using the in-transit data and the driving environment data in combination with a updated power consumption rate data model; and S3, predicting the remaining driving mileage of the electric vehicle based on the power consumption per mileage.

The above-mentioned in-transit data refers to data related to the electric vehicle during the driving of the electric vehicle, including battery status information, motor status information and vehicle speed information, wherein the battery status information includes the value of voltage of a battery pack, the value of current of the battery pack and the value of remaining charge of the battery pack, the motor status information includes a motor speed, and the vehicle speed information includes a current driving speed and driving mileage.

The above-mentioned driving environment data refers to data related to the driving of the electric vehicle at a current geographical position during the driving of the electric vehicle, including weather information and road condition information, wherein the weather information includes the type of weather at the current geographical position and an ambient temperature, and the road condition information includes the type and tilt degree of road surfaces.

It is to be understood that parameters and the number of the parameters in the in-transit data and the driving environment data in the embodiment of the present invention can be adjusted according to actual needs. For example, the vehicle speed information in the in-transit data may further include the life of the electric vehicle, the life of the battery, etc., and the adjustment of contents of the parameters and the number of parameters can also implement the solutions of the present invention and fall within the protection scope of the present invention.

Figure 2:
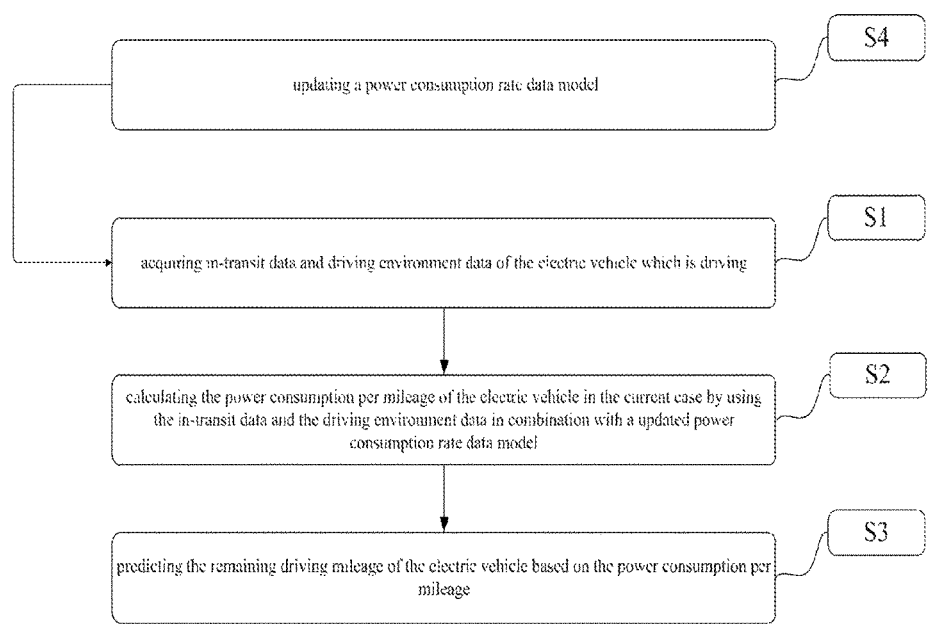
FIG. 2 is a schematic flowchart of a method for on-line prediction of the remaining driving mileage of an electric vehicle based on in-transit data provided by another embodiment of the present invention.

It can be seen that the present invention can improve the accuracy of the prediction result by collecting the in-transit data and the driving environment data of the electric vehicle which is driving at the present moment and calculating by using the latest data in combination with the power consumption rate data model. In order to further improve the accuracy of the prediction result, another embodiment of the present invention provides a method for on-line prediction of the remaining driving mileage of the electric vehicle, as shown in FIG. 2, comprising:

S4, updating a power consumption rate data model;

S1, acquiring in-transit data and driving environment data of the electric vehicle which is driving;

S2, calculating the power consumption per mileage of the electric vehicle in the current case by using the in-transit data and the driving environment data in combination with the updated power consumption rate data model; and S3, predicting the remaining driving mileage of the electric vehicle based on the power consumption per mileage.

It should be noted that the step S4 in the present embodiment may be provided at any position in the steps S1 to S3. For example, when the step S4 is provided before/after the step S1, the step S2 may directly use the updated power consumption rate data model; when the step S4 is provided after the step S2 and before/after the step S3, the updated power consumption rate data model can be used for predicting the remaining driving mileage for the next cycle, that is, before/after step S1 in the next cycle. The above-mentioned cycle refers to a process of completing all the steps, that is, a process of obtaining one prediction result of the remaining driving mileage.

It is to be understood that the update frequency of the power consumption rate data model in the step S4 may affect the accuracy of the prediction result, for example, when a higher accuracy is required, the step S4 may be performed once every a predetermined number of cycles, or even once every cycle. Those skilled in the art can reasonably adjust the frequency of performing the step S4 according to the desired accuracy and the data processing speed, and the present invention does not limit this.

Figure 3:
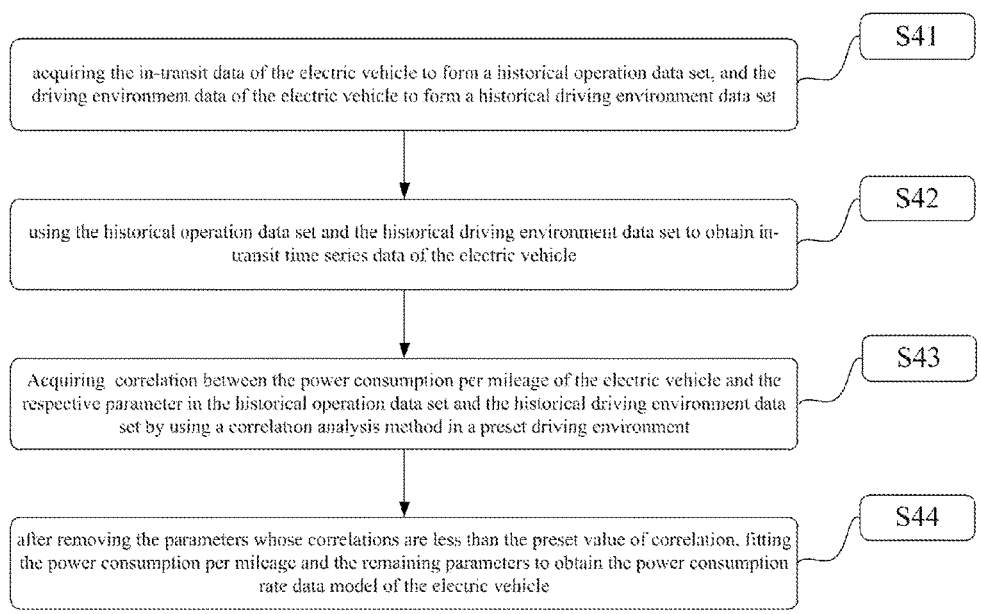
FIG. 3 is a schematic flowchart for updating a power consumption rate data model.

Alternatively, the step S4 of updating the power consumption rate data model of the embodiment of the present invention, as shown in FIG. 3, comprises:

S41, acquiring the in-transit data of the electric vehicle to form a historical running data set, and the driving environment data of the electric vehicle to form a historical driving environment data set.

In practical applications, the embodiment of the present invention reads the in-transit data of the electric vehicle through a CAN bus, including battery status information, motor status information and vehicle speed information. The above-mentioned battery status information includes the value of voltage V of the battery pack, the value of current I of the battery pack and the value of remaining charge B of the battery pack. The above-mentioned motor status information includes a motor speed R, and the vehicle speed information includes a current driving speed S and driving mileage L.

Before or after acquiring the in-transit data, the driving environment data of the electric vehicle collected by a driving environment data collecting device provided on the electric vehicle is continued to be read. The driving environment data includes weather information and road condition information, wherein the weather information includes the type of weather at the current geographical position and an ambient temperature, and the road condition information includes the type and tilt degree of road surfaces.

It should be noted that the above-mentioned driving environment data collecting device includes a network device which can directly obtain the corresponding weather information from the relevant authority, and further includes a measuring device which can obtain the road condition information, such as the type and tilt degree of road surfaces, in real time by using ultrasonic waves or a image processing method.

Then, the above-mentioned in-transit data and the above-mentioned driving environment data are stored in a file in which the historical running data set is located and a file in which the historical driving environment data set is located, respectively.

S42, fusing the historical running data set and the historical driving environment data set to obtain in-transit time series data of the electric vehicle.

In order to facilitate data processing, in the embodiment of the present invention, normalization processing is performed according to the characteristics and the value range of the parameters in the in-transit data and the driving environment data of the electric vehicle. The normalization processing method includes: one or more of a Min-Max normalization method, z-score normalization method, a decimal scaling normalization method, a linear function conversion method, a logarithmic function conversion method, an arccotangent function conversion method and a proportion method.

The above-mentioned Min-Max normalization method is calculated using the following formula:

$$x^* = \frac{x - x_{min}}{x_{max} - x_{min}}; \quad (1)$$

in the formula (1), x represents preset parameter values; $x^*$ represents the normalized values after the preset parameter values x are normalized; $x_{max}$ represents the maximum value in the preset parameter values; and $x_{min}$ indicates the minimum value in the preset parameter values.

The above-mentioned z-score normalization method is calculated using the following formula:

$$x^* = \frac{x - \mu}{\sigma}; \quad (2)$$

in the formula (2), $\mu$ represents the mean corresponding to each preset parameter; and $\sigma$ represents the standard deviation corresponding to each preset parameter.

The above-mentioned decimal scaling normalization method is calculated using the following formula:

$$x^* = \frac{x}{m}; \quad (3)$$

in the formula (3), m represents the maximum value of a certain parameter value, for example, when the maximum value of the temperature is 100 degrees Celsius, the value of the above-mentioned m is 100.

The Min-Max normalization method, the z-score normalization method, and the decimal scaling normalization method above are applicable to the case where the parameter values include a negative value. For example, the ambient temperature is positive in the summer and may be negative in the winter. In practical applications, the parameters of the in-transit data and the driving environment data are mainly positive values, and thus one or more of the linear function conversion method, the logarithmic function conversion method, the arccotangent function conversion method and the proportion method can be used to perform normalization.

The linear function conversion method above is implemented by the formula (1), wherein the value of $x^*$ is in the range of (0, 1).

The logarithmic function conversion method above is calculated using the following formula:

$$x^* = \log_{10}(x); \quad (4)$$

the arccotangent function conversion method above is calculated using the following formula:

$$x^* = \frac{\operatorname{atan}(x) * 2}{PI}; \quad (5)$$

in the formula (5), atan(x) represents an arccotangent function, and PI represents circumference ratio.

The proportion method above refers to the ratio of each parameter value to the sum of the parameter values.

To further facilitate data processing, in the present invention, the parameters of the in-transit data and the driving environment data are integerized by using different digital serial numbers (e.g., 0, 1, 2, 3 . . . ) to represent different weather types and road types, dividing the ambient temperature into different temperature ranges represented with digital serial numbers (for example, . . . −3, −2, −1, 0, 1, 2, 3 . . . ), and representing tilt condition of the road surfaces with numbers (for example, . . . −2, −1, 0, 1, 2 . . . ) according to the driving direction of the electric vehicle, where the positive and negative sign of the number indicates that the road surface is tilted downward or upward, and the absolute value of the number indicates the tilt degree of the road surface.

After normalizing or integerizing the in-transit data and the driving environment data, the in-transit data and the driving environment data are fused into a data set according to the recording time of each parameter to be saved in a file in which the in-transit time series data is located.

S43, acquiring correlation between the power consumption per mileage of the electric vehicle and the respective parameter in the historical running data set and the historical driving environment data set by using a correlation analysis method in a preset driving environment.

In practical applications, after acquiring the in-transit time series data, a analysis time window is determined in the preset driving environment, and denoted by n∆t. The preset driving environment refers to in the same time window, the in-transit data and the driving environment data of the electric vehicle are unchanged, or the degree of change is within a preset range. The preset range may be set according to the specific situation, and the present invention is not limited thereto.

For the in-transit data included in each analysis time window, the power consumption per mileage of the electric vehicle is calculated by using the formula of the preset power consumption per mileage, wherein the formula is:

$$C_L = \frac{B_{t_1} - B_{t_n}}{L_{t_n} - L_{t_1}}; \quad (6)$$

in the formula (6) $C_L$ is the power consumption per mileage of the electric vehicle; $B_{t_1}$ and $B_{t_n}$ represents the remaining power of the electric vehicle at the start time and end time of the time window, respectively; and $L_{t_n}$ and $L_{t_1}$ represents the driving mileage of the electric vehicle at the start time and end time of the time windows, respectively.

Then, the correlation between the respective parameter (including temperature, the status of road surfaces, the status of the battery, the vehicle speed, the motor speed, and so on) in the historical running data set and the historical driving environment data set and the power consumption per mileage of the electric vehicle is calculated by calculating the power consumption per mileage of the electric vehicle at K different analysis time windows, that is, $C_L^1$, $C_L^2$, $C_L^3$, . . . , $C_L^K$, and then using a factor analysis method.

S44, after removing the parameters whose correlations are less than the preset value of correlation, fitting the power consumption per mileage and the remaining parameters to obtain the power consumption rate data model of the electric vehicle.

After removing the parameters whose correlations are less than the preset value of correlation, the value of each coefficient $a_m$ in the preset power consumption rate data model of the battery of the electric vehicle, that is, $C_L = a_1 f$ $(x_1)+a_2 f(x_2)+ \ldots +a_m f(x_m)+ \ldots +a_N f(x_N)$, and the linear or mapping relationship between the respective correlation function $f(x_m)$ and the respective parameter $x_m$ are determined by the control variable method using the remaining parameters, i.e., the parameters whose correlations are not less than the preset value of correlation, that is, $x_1$, $x_2, \ldots, x_m, \ldots, x_N$, thereby obtaining the power consumption rate data model, wherein, $x_1, x_2, \ldots, x_m, \ldots, x_N$ represents that the parameters whose correlations are not less than the preset value of correlation; $f(x_1)$, $f(x_2), \ldots, f(x_m), \ldots, f(x_N)$ represents the correlation function between each parameter and the model; $a_1$, $a_2, \ldots, a_m, \ldots, a_N$ represents the coefficient of the respective function; and m is a nonzero natural number less than N.

In the embodiment of the present invention, when the power consumption per mileage $C_L^1$ of the electric vehicle in the current case is obtained, the prediction value of the remaining driving mileage of the electric vehicle can be calculated by the following formula:

$$L_P = \frac{B_t}{C_L^t}; \quad (7)$$

in the formula (7), $B_t$ represents the remaining power of the electric vehicle.

Figure 4:
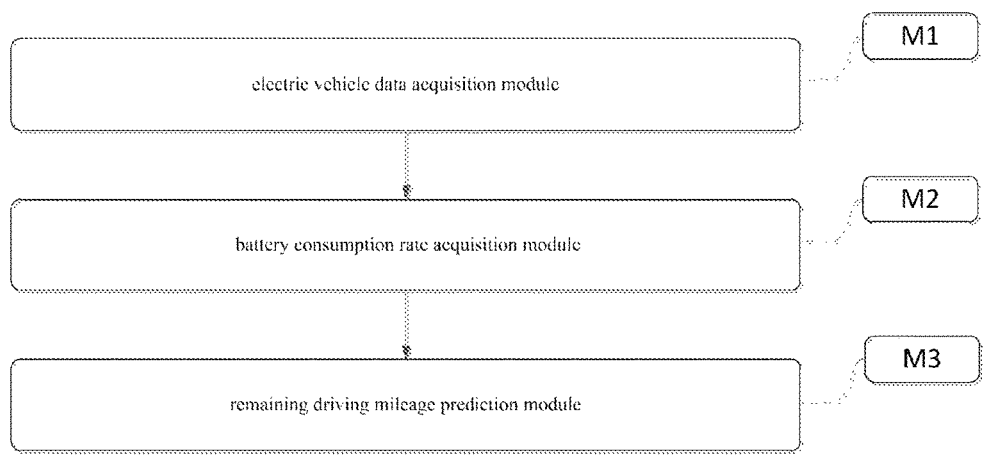
FIG. 4 is a block diagram of a device for on-line prediction of a remaining driving mileage of an electric vehicle based on in-transit data provided by an embodiment of the present invention.

In order to demonstrate the superiority of the method for on-line prediction of the remaining driving mileage of the electric vehicle provided by the embodiment of the present invention, the embodiment of the present invention also provides a device for on-line prediction of the remaining driving mileage of an electric vehicle, as shown in FIG. 4, comprising:

an electric vehicle data acquisition module M1, for acquiring in-transit data and driving environment data of the electric vehicle that is driving;

a battery consumption rate acquisition module M2, for calculating the power consumption per mileage of the electric vehicle in the current case by using the in-transit data and the driving environment data in combination with a power consumption rate data model; and a remaining driving mileage prediction module M3, for predicting the remaining driving mileage of the electric vehicle based on the power consumption per mileage.

Figure 5:
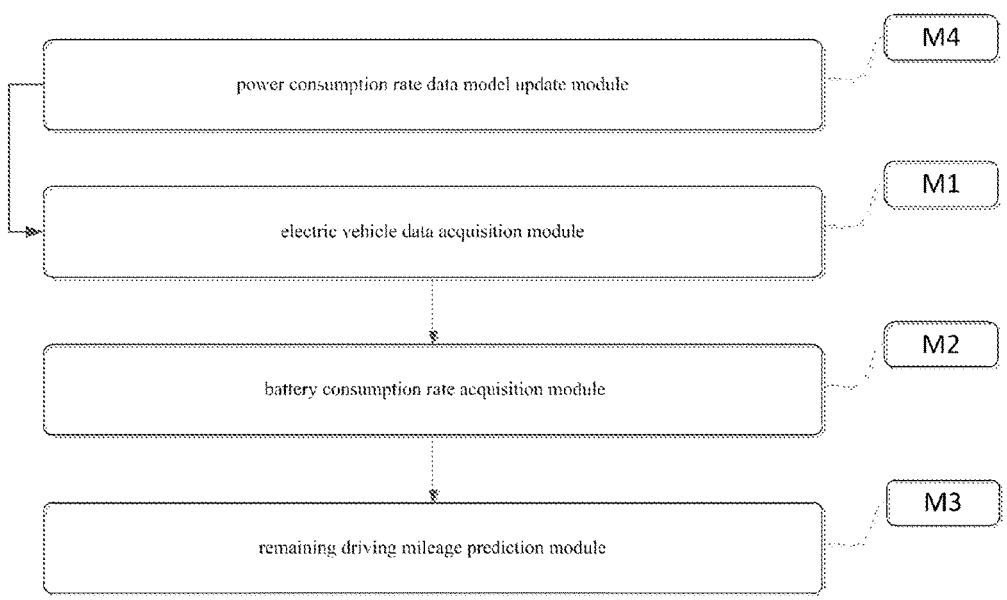
FIG. 5 is a block diagram of a device for on-line prediction of remaining driving mileage of an electric vehicle based on in-transit data provided by another embodiment of the present invention.
Figure 6:
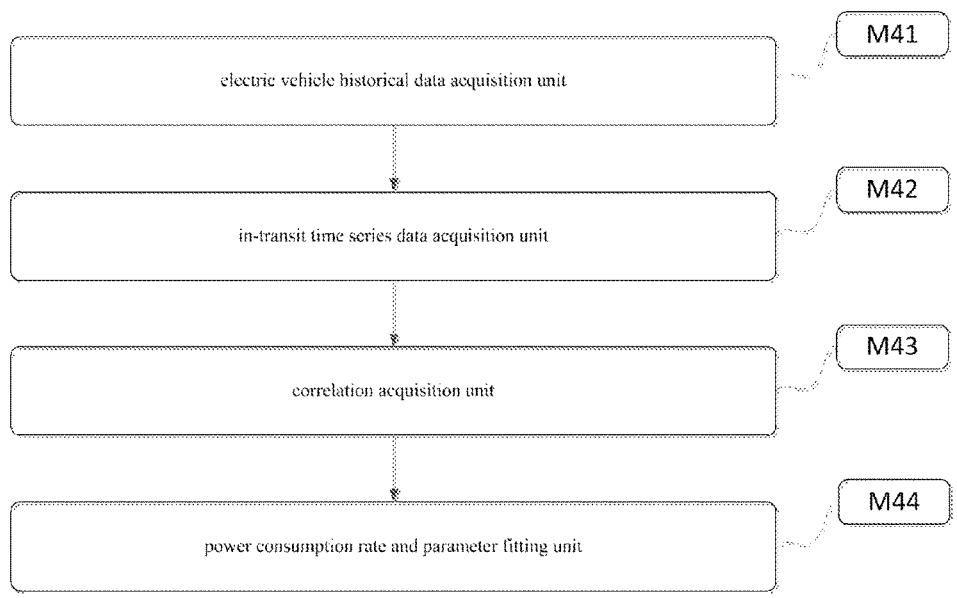
FIG. 6 is a block diagram of an update module of a power consumption rate data model.

Alternatively, as shown in FIG. 5, the device for on-line prediction of the remaining driving mileage of the electric vehicle provided by the embodiment of the present invention further includes a power consumption rate data model update module M4. The power consumption rate data model update module M4 is used to update the power consumption rate data model according to a preset cycle, specifically including:

an electric vehicle historical data acquisition unit M41, for acquiring the in-transit data of the electric vehicle to form a historical running data set, and the driving environment data of the electric vehicle to form a historical driving environment data set;

an in-transit time series data acquisition unit M42, for fusing the historical running data set and the historical driving environment data set to obtain in-transit time series data of the electric vehicle;

a correlation acquisition unit M43, for acquiring correlation between the power consumption per mileage of the electric vehicle and the respective parameter in the historical running data set and the historical driving environment data set by using a correlation analysis method in a preset driving environment; and a power consumption rate and parameter fitting unit M44, for after removing the parameters whose correlations are less than the preset value of correlation, fitting the power consumption per mileage and the remaining parameters to obtain the power consumption rate data model of the electric vehicle.

The device provided by the present invention is implemented based on the method described above, and thus can solve the same technical problems and obtain the same technical effect. For details, please refer to the contents of the method embodiments and they will not be described herein.

In view of the above, the present invention obtains in-transit data and driving environment data of the electric vehicle that is driving; then calculating the battery consumption rate of the electric vehicle in the current driving environment by using the data above and the power consumption rate data model; finally, predicting the remaining driving mileage of the electric vehicle based on the power consumption per mileage in the current case. The present invention using the in-transit data and the driving environment data of the electric vehicle in real time can guarantee the authenticity of the data, while the power consumption rate data model being maintained to be the update state can guarantee the accuracy of the prediction result. The prediction result of the present invention is more accurate, to avoid problems that the power is exhausted due to exceeding the mileage expected by the user so that the electric vehicle cannot continue to drive, thereby improving the driving experience of the user.

In the specification of the present invention, a large number of specific details are described. It is to be understood, however, that the embodiments of the present invention may be practiced without these specific details. In some embodiments, the well-known methods, structures and techniques are not shown in detail, so as not to obscure the understanding of the specification. Similarly, it should be understood that, in order to simplify the present disclosure and to assist in understanding one or more of the various inventive aspects, in the description of the exemplary embodiments of the present invention above, the various features of the present invention are sometimes grouped together into a single embodiment, a diagram or description thereof. However, the disclosed method should not be interpreted into reflecting the following intent: the claimed invention claims more features than those explicitly recited in each of the claims. More specifically, as reflected in the claims, the inventive aspect is less than all the features of the single embodiment disclosed above. Accordingly, the claims that follow a specific embodiment are explicitly incorporated into this specific embodiment, wherein each claim itself is taken as a separate embodiment of the present invention.

It should be noted that the embodiments above are merely used to illustrate the technical solutions of the present invention and are not intended to limit them. While the present invention has been described in detail with reference to the foregoing embodiments, it will be understood by those skilled in the art that modifications can be made to the technical solutions described in the foregoing embodiments or equivalent substitutions can be made to some or all of the technical features therein, and such modifications or substitutions do not make the nature of the corresponding technical solution depart from the scope of the technical solution of the respective embodiment of the present invention and be covered within the scope of the claims and the specification of the present invention.

What is claimed is:

1. A method for on-line prediction of remaining driving mileage of an electric vehicle, characterized in that, the method comprises using a device for on-line prediction of remaining driving mileage of an electric vehicle to execute the steps of:

acquiring in-transit data of the electric vehicle which is driving through a CAN (Controller Area Network) bus, the in-transit data including battery status information, motor status information and vehicle speed information, wherein the battery status information includes the value of voltage of a battery pack, the value of current of the battery pack and the value of remaining charge of the battery pack, the motor status information includes a motor speed, and the vehicle speed information includes a current driving speed and driving mileage;

acquiring driving environment data of the electric vehicle through a driving environment data collecting device including a network device which can directly obtain corresponding weather information from the relevant authority and a measuring device which can obtain the road condition information, the driving environment data including weather information and road condition information, wherein the weather information includes the type of weather at the current geographical position and an ambient temperature, and the road condition information includes the type and tilt degree of road surfaces;

calculating power consumption per mileage of the electric vehicle in the current case by using the in-transit data and the driving environment data in combination with a updated power consumption rate data model; and predicting the remaining driving mileage of the electric vehicle based on the power consumption per mileage;

wherein the updated power consumption rate data model is obtained through following steps:

acquiring the in-transit data of the electric vehicle to form a historical running data set, and acquiring the driving environment data of the electric vehicle to form a historical driving environment data set;

fusing the historical running data set and the historical driving environment data set to obtain in-transit time series data of the electric vehicle;

acquiring correlation between the power consumption per mileage of the electric vehicle and the respective parameter in the historical running data set and the historical driving environment data set by using a correlation analysis method in a preset driving environment; and after removing parameters whose correlations are less than a preset value of correlation, fitting the power consumption per mileage and remaining parameters to obtain the power consumption rate data model of the electric vehicle.

2. The method for on-line prediction of the remaining driving mileage of the electric vehicle according to claim 1, characterized in that, the step of acquiring the in-transit data of the electric vehicle to form the historical running data set, and the driving environment data of the electric vehicle to form the historical driving environment data set comprises:

reading the in-transit data of the electric vehicle through a CAN (Controller Area Network) bus, the in-transit data including battery status information, motor status information and vehicle speed information, wherein the battery status information includes the value of voltage of a battery pack, the value of current of the battery pack and the value of remaining charge of the battery pack, the motor status information includes a motor speed, and the vehicle speed information includes a current driving speed and driving mileage;

reading the driving environment data of the electric vehicle, the driving environment data including weather information and road condition information, wherein the weather information includes the type of weather at the current geographical position and an ambient temperature, and the road condition information includes the type and tilt degree of road surfaces; and storing the in-transit data and the driving environment data in a file in which the historical running data set is located and a file in which the historical driving environment data set is located, respectively.

3. The method for on-line prediction of the remaining driving mileage of the electric vehicle according to claim 1, characterized in that, the step of fusing the historical running data set and the historical driving environment data set to obtain the in-transit time series data of the electric vehicle comprises:

performing normalization processing on the in-transit data;

performing parameterization processing on the driving environment data; and fusing the in-transit data and the driving environment data into a data set according to the recording time to be saved in a tile in which the in-transit time series data is located.

4. The method for on-line prediction of the remaining driving mileage of the electric vehicle according to claim 3, characterized in that, the method of the normalization processing includes: one or more of a Min-Max normalization method, z-score normalization method, a decimal scaling normalization method, a linear function conversion method, a logarithmic function conversion method, an arccotangent function conversion method and a proportion method.

5. The method for on-line prediction of the remaining driving mileage of the electric vehicle according to claim 1, characterized in that, the step of acquiring the correlation between the power consumption per mileage of the electric vehicle and the respective parameter in the historical running data set and the historical driving environment, data set by using the correlation analysis method in the preset driving environment comprises:

selecting and determining a analysis time window according to the preset driving environment;

calculating the power consumption per mileage of the electric vehicle according the in-transit data included in each analysis time window and the formula of a preset power consumption per mileage; and calculating the correlation between the respective parameter in the historical running data set and the historical driving environment data set and the power consumption per mileage of the electric vehicle by using a factor analysis method.

6. The method for on-line prediction of the remaining driving mileage of the electric vehicle according to claim 5, characterized in that, the formula of the preset power consumption per mileage is:

$$C_L = \frac{B_{t_1} - B_{t_n}}{L_{t_n} - L_{t_1}};$$

in the formula, $C_L$ is the power consumption per mileage of the electric vehicle; $B_{t_1}$ and $B_{t_q}$ represents the remaining power of the electric vehicle at the start time and end time of the time window, respectively; and $L_{t_q}$ and $L_{t_1}$ represents the driving mileage of the electric vehicle at the start time and end time of the time windows, respectively.

7. The method for on-line prediction of the remaining driving mileage of the electric vehicle according to claim 1, characterized in that, the step of after removing the parameters whose correlations are less than the preset value of correlation, fitting the power consumption per mileage and the remaining parameters to obtain the power consumption rate data model of the electric vehicle comprises:

presetting the power consumption rate data model of the electric vehicle, that is, $C_L = a_1 f(x_1) + a_2 f(x_2) + \ldots + a_m f(x_m) + \ldots + a_N f(x_N)$, wherein $x_1, x_2, \ldots, x_m, \ldots, x_N$ represents that the parameters whose correlations are not less than the preset value of correlation; $f(x_1)$, $f(x_2), \ldots, f(x_m), \ldots, f(x_N)$ represents the correlation function between each parameter and the model; $a_1$, $a_2, \ldots, a_m, \ldots, a_N$ represents the coefficient of the respective function; and in is a nonzero natural number less than N; and calculating the value of each coefficient am and the linear or mapping relationship between the respective correlation function $f(x_m)$ and the respective parameter xm by the control variable method using the in-transit data in a preset number of analysis time windows, so as to obtain the power consumption rate data model.

* * * * *